Inventor
Albert W. Russel
By Whittemore Hulbert & Whittemore
Attorneys

Patented Aug. 7, 1923.

1,463,912

UNITED STATES PATENT OFFICE.

ALBERT W. RUSSEL, OF DETROIT, MICHIGAN, ASSIGNOR TO RUSSEL MOTOR AXLE COMPANY, OF DETROIT, MICHIGAN, A CORPORATION OF MICHIGAN.

VEHICLE AXLE.

Application filed May 29, 1919. Serial No. 300,671.

*To all whom it may concern:*

Be it known that I, ALBERT W. RUSSEL, a citizen of the United States of America, residing at Detroit, in the county of Wayne and State of Michigan, have invented certain new and useful Improvements in Vehicle Axles, of which the following is a specification, reference being had therein to the accompanying drawings.

The invention relates to vehicle axles of that type in which the wheels are driven from a jack shaft through the medium of pinions and internal gears. The invention consists in the peculiar construction with the particular reference to the means for excluding dust or grit from the lubricated working parts.

Figure 1:
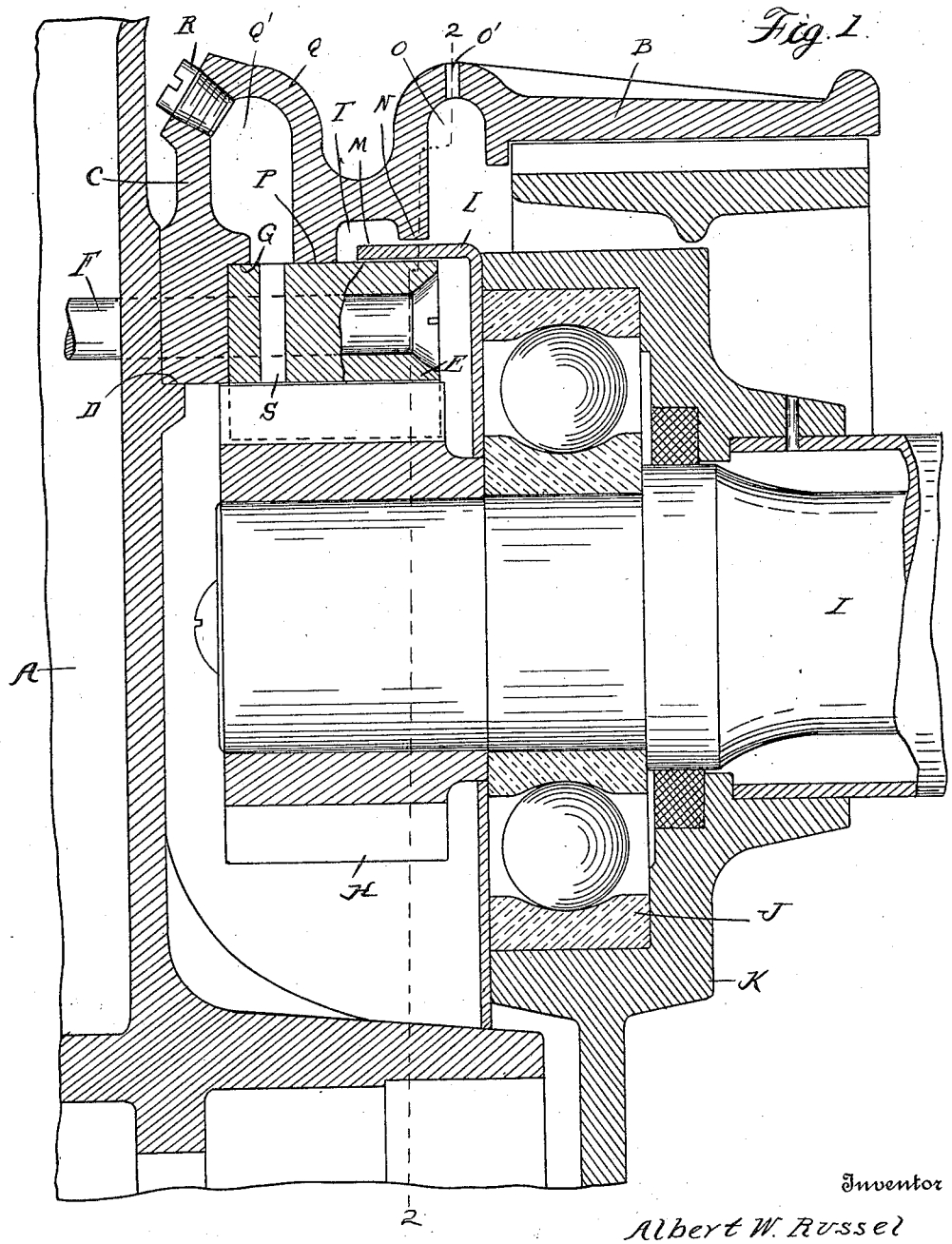
Figure 1 is a longitudinal section of a portion of the axle.
Figure 2:
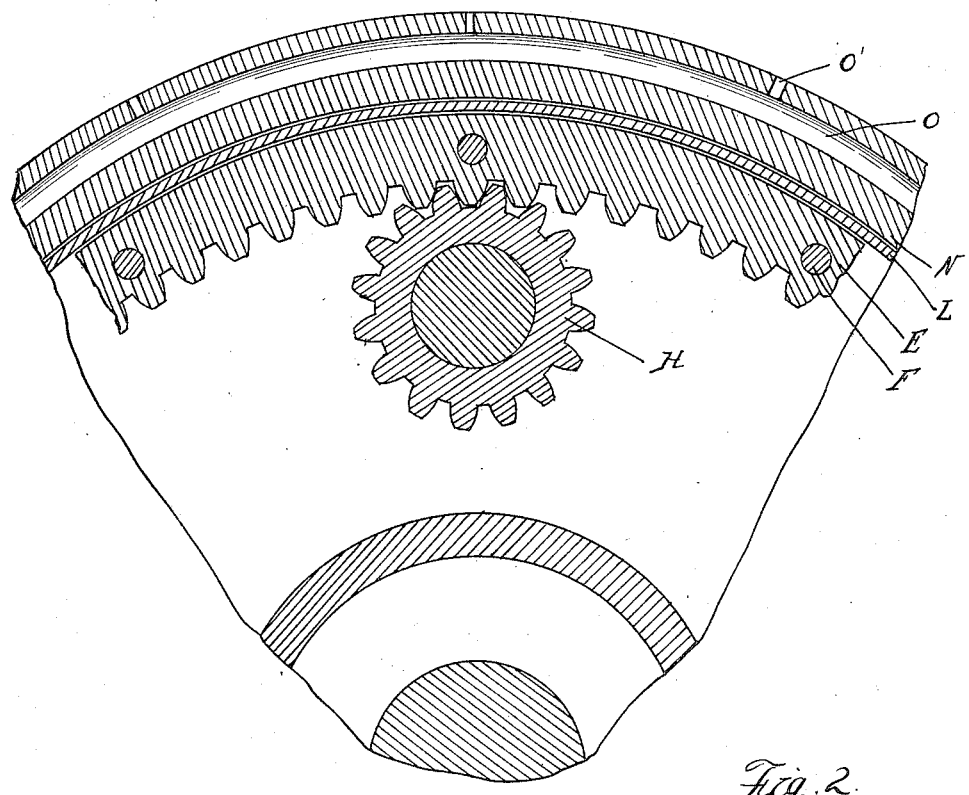
Figure 2 is a cross-section thereof.

In the construction of vehicle axles of the type above referred to, it is usual to provide a brake drum within which is placed the internal gear for driving the wheel. The gear and pinion, which are in mesh with each other, are lubricated usually by a dope or relatively non-fluid lubricant, but it is essential to exclude dirt and grit from the lubricated parts. It is also important to avoid the feeding of lubricant onto the braking surface of the drum. I have, therefore, devised a construction in which the stationary or non-revoluble closure for the gear and pinion forms a relatively close fitting engagement with the smooth periphery of the gear. I further provide a cooperating portion on the brakedrum which forms a second sealing joint with the non-revoluble part together with an annular pocket for receiving the lubricant escaping from the gear. Thus, centrifugal action will cause the feeding of lubricant from the gear into the pocket while escape from the pocket will be against centrifugal action and will therefore be relatively slow. However, the slow outward movement of the lubricant will carry away any dust of grit and prevent the same from finding access to the working parts. Lubricant upon the braking surface is objectionable as it diminishes the braking power, and this is overcome by providing means of escape of the lubricant from the brake drum intermediate the portion forming the lubricant pocket and the portion provided with the braking surface.

In detail, A is the vehicle wheel of any suitable construction and B is the brake drum which has a flange C bolted or secured to the wheel. Shoulders D on the wheel form a pilot for accurately centering the flange C and drum B concentric with the axis. E is the ring gear which is secured to the flange C by the bolts F and which is held exactly concentric to the axis by an annular shoulder G on the flange C. H is the pinion which meshes with the internal gear E and is mounted upon the jack shaft I, the latter being secured in bearings J upon the stationary axle housing or frame K.

To form a closure for the ring gear and pinion and to hold the lubricant therein, I have provided the member L, preferably formed of pressed sheet metal, mounted on the frame K and arranged adjacent to the ring gear. This member L has a cylindrical flange M, the internal diameter of which is slightly greater than the external diameter of the ring gear so as to form a close working fit therewith. There is also preferably provided an inward projection N on the drum B which closely fits the external surface of the flange M so that any lubricant leaking between the ring gear and the flange M must also pass in the reverse direction between said flange and the member N. Between the inward projection N and the braking face of the drum there is formed an annular groove O with apertures O' arranged at intervals extending through the drum so as to provide escape for any lubricant entering the groove. This will prevent the lubricant from following around the surface of the drum on to the braking surface.

For reinforcing and strengthening the ring gear there is provided in addition to the shoulder G on the flange C a second bearing formed by an annular inward projection P. The inner face of this bearing is machined to a press fit with the outer face of the ring gear and as the point of bearing is near the center of length of the gear the latter will be strongly reinforced. As an incident to this construction there will be formed a pocket or recess between the shoulder G and bearing P and I have utilized this space as a container for a supply of lubricant to be fed to the toothed surface of the ring gear.

Furthermore to enlarge the content of the recess the wall of the drum intermediate the flange C and the bearing P is bulged outward, as indicated at Q, so as to form a recess Q' of considerable capacity. A removable plug R constitutes the means for filling the recess with lubricant and to feed the lubricant to the teeth of the gear small channels S are bored at intervals through the ring.

With the construction as described, in use the recess Q' is filled with lubricant, preferably a semi-solid dope, and this will be slowly fed through the channels S into the interdental face of the ring gear. This will maintain the working surface of said gear well lubricated, while the lubricant which flows over the end and is thrown out by centrifugal action is retained by the flange M. An annular recess T is preferably formed between the inward projections P and N which will retain the escaping lubricant and check its outward flow, while the small quantity of lubricant that finally forces its way between the flange M and member N will carry out with it any dust or grit which might otherwise force its way into the casing. Finally the lubricant that does escape will pass into the groove O and will escape through the apertures O' without finding its way to the braking surface.

What I claim as my invention is:

1. In an axle, the combination with a wheel, of a brake drum mounted thereon, an internal gear ring mounted within said brake drum concentric with the axis, a pinion in mesh with said internal gear, a closure arranged in a plane parallel to said internal gear and having a laterally extending annular flange closely fitting the external or peripheral surface of said ring, and an inward annular projection on said brake drum closely fitting the outer surface of said annular flange.

2. In an axle, the combination with a wheel, of a brake drum mounted on said wheel, an internal gear ring mounted within said brake drum, a pinion in mesh with said internal gear, a closure extending in a plane parallel to said ring and having a laterally extending annular flange overlapping and closely fitting the peripheral surface of said ring, an annular inward projection on said drum having a portion closely fitting the external surface of said annular flange, and another portion bearing against the external surface of said ring gear with an annular recess between said portions.

3. In an axle, the combination with a wheel, of a brake drum mounted on said wheel and an internal gear ring mounted within said brake drum, a pinion meshing with said internal gear, a closure extending in a plane parallel to said ring and having a laterally extending annular flange closely fitting the external or peripheral surface of said ring, an inwardly extending annular projection from said drum closely fitting the outer surface of said flange, and means intermediate said annular projection and the braking surface of the drum for interrupting the continuity of lubricant, said means including a passage for permitting of the escape of the lubricant.

4. In an axle, the combination with a wheel, of a brake drum mounted thereon, an internal gear ring mounted within said brake drum, its inner end engaging an annular shoulder on the flange of said drum which secures the same to said wheel, an inward annular projection on said drum forming a second bearing for said ring spaced from said shoulder and forming therebetween an annular recess for containing lubricant, and a closure extending in a plane parallel to said ring and having a laterally projecting annular flange closely fitting the peripheral surface of said ring beyond the annular bearing for said ring on the drum, said ring having one or more channels extending therethrough connecting said annular recess containing lubricant with the internal toothed face of the gear.

5. In an axle, the combination with a wheel, of a brake drum mounted thereon having a securing flange parallel to the plane of the wheel, a cylindrical braking portion and an intermediate portion return-bent in cross-section, an internal ring gear mounted within said drum having a shouldered bearing for its inner end upon the flange of said drum, and a second bearing on the return-bent portion of said drum whereby an annular chamber is formed around said ring between said portions forming a container for lubricant and communicating through channels in the ring with the internal toothed face thereof, a closure member arranged in a plane parallel to said gear ring and having a laterally extending annular flange closely fitting the peripheral face of said ring, said return-bent portion having an annular bearing portion closely fitting the external surface of said flange with an annular recess between said bearing and the bearing on said ring, and a grooved portion between said return-bent portion of the drum and the braking face thereof, said groove having apertures through the drum for escape of lubricant.

6. In an axle, the combination with a wheel and an internal gear ring mounted thereon, of a pinion in mesh with said gear, a non-revoluble closure for said gear and pinion, and means cooperating with said closure for forming an annular inwardly opening lubricant-containing pocket outside of said ring constituting a dust and grit excluding seal.

7. In an axle, the combination with a wheel and an internal gear ring mounted thereon, of a pinion in mesh with said gear, a non-revoluble closure having a close fitting joint with the peripheral surface of said ring gear, and revoluble means cooperating with the portion of said closure having a close fitting joint with said gear for forming at the periphery of said gear an inwardly opening lubricant receiving pocket constituting a dust and grit excluding seal.

8. In an axle, the combination with a wheel and an internal ring gear mounted thereon, of a pinion in mesh with said gear, a non-revoluble closure having a close fitting joint with the peripheral surface of said ring gear, a brake drum revoluble with the gear forming a second close fitting joint with said non-revoluble member, and an inwardly opening lubricant-receiving pocket between said joints and formed in said brake-drum, the latter constituting a dust and grit excluding seal.

9. In an axle, the combination with a wheel, and an internal ring gear mounted thereon, of a pinion in mesh with said gear, a non-revoluble closure having a close fitting joint with the peripheral surface of said ring gear, and a brake drum revoluble with the gear forming a second close fitting joint with said non-revoluble member and providing an inwardly opening annular pocket outside of the circle of said joint for receiving lubricant, whereby centrifugal action will fill said pocket with lubricant and escape of the lubricant from said pocket will be countered by centrifugal action.

10. In an axle, the combination with a wheel, of a brake drum mounted thereon, an internal gear mounted within said brake drum, a pinion in mesh with said internal gear, a non-revoluble closure having a close fitting joint with the peripheral surface of said internal gear and forming in connection therewith a lubricant container, and an aperture in said brake drum intermediate the braking surface of the drum and the close fitting joint for permitting the escape of lubricant.

In testimony whereof I affix my signature.

ALBERT W. RUSSEL.